United States Patent
Zivic et al.

(10) Patent No.: US 12,518,307 B1
(45) Date of Patent: Jan. 6, 2026

(54) HUMAN BODY SCANNING FOR SIZE RECOMMENDATION

(71) Applicant: Meta Platforms Technologies, LLC, Menlo Park, CA (US)

(72) Inventors: Nenad Zivic, Zurich (CH); Fabio Cappello, Zurich (CH); Alexandru-Eugen Ichim, Ruschlikon (CH); Christina Sheeva Tanouye, Zurich (CH); Nebojsa Andelkovic, Zurich (CH); Aleksei Sidnev, Zurich (CH); Ferran Rigual Aparici, Adliswil (CH); Gabriela Evrova, Zurich (CH); Carlos Chacon Navarro, Munich (DE); Artslom Sanakoyeu, Zurich (CH); Arman Ozgun, Hicksville, NY (US); Ana Dodik, Zürich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 147 days.

(21) Appl. No.: 17/992,632

(22) Filed: Nov. 22, 2022

Related U.S. Application Data

(60) Provisional application No. 63/404,471, filed on Sep. 7, 2022.

(51) Int. Cl.
*G06Q 30/00* (2023.01)
*G06Q 30/0601* (2023.01)
*G06T 7/62* (2017.01)

(52) U.S. Cl.
CPC ..... *G06Q 30/0627* (2013.01); *G06Q 30/0643* (2013.01); *G06T 7/62* (2017.01); *G06T 2207/30196* (2013.01)

(58) Field of Classification Search
CPC .................................................. G06Q 30/06–08
See application file for complete search history.

(56) References Cited

U.S. PATENT DOCUMENTS

| 6,842,175 B1 | 1/2005 | Schmalstieg et al. |
| 8,812,954 B2 | 8/2014 | Shuster et al. |
| (Continued) | | |

FOREIGN PATENT DOCUMENTS

| CN | 105190703 A | 12/2015 |
| CN | 107209950 A | 9/2017 |
| (Continued) | | |

OTHER PUBLICATIONS

Coury, Nicole, "Consumer Perceptions of Apparel Fit Satisfaction and Sizing Based Upon 3D Body Scanning and Block Garment Assessment", Univ. or Arkansas, Proquest Dissertations & Theses, 2015 (Year: 2015).*

(Continued)

*Primary Examiner* — Ethan D Civan
(74) *Attorney, Agent, or Firm* — Potomac Law Group, PLLC; Dannon G. Allbee

(57) ABSTRACT

Methods, systems, and storage media for human body scanning for size recommendation are disclosed. Exemplary implementations may: receive a request to perform a self-guided body scan; in response to receiving the request, initiate a body scanning process comprising at least a front scan and a side scan; receive the front scan and the side scan; generate a size recommendation based at least in part on the front scan and the side scan; and cause display of the size recommendation through a user interface.

20 Claims, 13 Drawing Sheets

(56) References Cited

U.S. PATENT DOCUMENTS

| | | |
|---|---|---|
| 9,047,706 B1 | 6/2015 | Ogale |
| 9,323,325 B2 | 4/2016 | Perez et al. |
| 9,588,593 B2 | 3/2017 | Li |
| 9,761,052 B2 | 9/2017 | Groten et al. |
| 9,814,982 B2 | 11/2017 | Chuaypradit et al. |
| 9,843,772 B2 | 12/2017 | Lee et al. |
| 10,242,476 B2 | 3/2019 | Bastaldo-Tsampalis et al. |
| 10,281,981 B2 | 5/2019 | Kim et al. |
| 10,297,082 B2 | 5/2019 | Wilson et al. |
| 10,304,247 B2 | 5/2019 | King |
| 10,503,351 B2 | 12/2019 | Gullicksen |
| 10,733,800 B2 | 8/2020 | Booth et al. |
| 10,803,315 B2 | 10/2020 | Cho et al. |
| 11,106,038 B2 | 8/2021 | Roggatz |
| 11,176,748 B2 | 11/2021 | Ohashi |
| 11,227,446 B2 | 1/2022 | Malia et al. |
| 11,314,376 B2 | 4/2022 | Agarawala et al. |
| 11,666,825 B2 | 6/2023 | Delamont |
| 11,789,526 B2 | 10/2023 | Jo et al. |
| 11,829,527 B2 | 11/2023 | Kim et al. |
| 11,829,959 B1 | 11/2023 | Latif et al. |
| 11,830,148 B2 | 11/2023 | Booth et al. |
| 11,927,756 B2 | 3/2024 | Jeong et al. |
| 11,928,819 B2 | 3/2024 | Sieckmann et al. |
| 11,941,315 B2 | 3/2024 | Jeong et al. |
| 12,003,697 B2 | 6/2024 | Hong |
| 12,008,170 B2 | 6/2024 | Kim et al. |
| 12,032,728 B2 | 7/2024 | Munro et al. |
| 12,113,374 B2 | 10/2024 | Yoon et al. |
| 12,118,678 B2 | 10/2024 | Choi et al. |
| 2002/0050988 A1 | 5/2002 | Petrov et al. |
| 2002/0158873 A1 | 10/2002 | Williamson |
| 2008/0015018 A1 | 1/2008 | Mullen |
| 2008/0089577 A1 | 4/2008 | Wang |
| 2009/0251465 A1 | 10/2009 | Hassenpflug |
| 2009/0279784 A1 | 11/2009 | Arcas et al. |
| 2010/0245376 A1 | 9/2010 | Bar-Zeev et al. |
| 2010/0315412 A1 | 12/2010 | Sinha et al. |
| 2011/0230263 A1 | 9/2011 | Ng |
| 2012/0001901 A1 | 1/2012 | Park |
| 2012/0069018 A1 | 3/2012 | Yamaya et al. |
| 2012/0142415 A1 | 6/2012 | Lindsay |
| 2012/0194516 A1 | 8/2012 | Newcombe et al. |
| 2012/0249741 A1 | 10/2012 | Maciocci et al. |
| 2012/0263154 A1 | 10/2012 | Blanchflower et al. |
| 2012/0264510 A1 | 10/2012 | Wigdor et al. |
| 2013/0018952 A1 | 1/2013 | McConnell et al. |
| 2013/0083062 A1 | 4/2013 | Geisner et al. |
| 2013/0141418 A1 | 6/2013 | Edholm |
| 2013/0141428 A1 | 6/2013 | Gipson |
| 2013/0196759 A1 | 8/2013 | Kim |
| 2013/0196772 A1 | 8/2013 | Latta et al. |
| 2013/0215230 A1 | 8/2013 | Miesnieks et al. |
| 2013/0225296 A1 | 8/2013 | Kim |
| 2013/0342564 A1 | 12/2013 | Kinnebrew et al. |
| 2014/0071251 A1 | 3/2014 | Nakamura et al. |
| 2014/0218361 A1 | 8/2014 | Abe et al. |
| 2015/0015576 A1 | 1/2015 | Algreatly |
| 2015/0016777 A1 | 1/2015 | Abovitz et al. |
| 2015/0029214 A1 | 1/2015 | Kumagai |
| 2015/0154453 A1* | 6/2015 | Wilf ................... G06T 7/564 |
| | | 382/103 |
| 2015/0312561 A1 | 10/2015 | Hoof et al. |
| 2015/0348511 A1 | 12/2015 | Oriol et al. |
| 2016/0012157 A1 | 1/2016 | Williams et al. |
| 2016/0026253 A1 | 1/2016 | Bradski et al. |
| 2016/0027215 A1 | 1/2016 | Burns et al. |
| 2016/0093108 A1 | 3/2016 | Mao et al. |
| 2016/0212272 A1 | 7/2016 | Srinivasan et al. |
| 2016/0253844 A1 | 9/2016 | Petrovskaya et al. |
| 2016/0300387 A1 | 10/2016 | Ziman |
| 2016/0321946 A1* | 11/2016 | Kim ................... G09B 19/00 |
| 2017/0053422 A1* | 2/2017 | Chojnowski ......... H04N 13/261 |
| 2017/0161948 A1 | 6/2017 | Hua et al. |
| 2017/0287218 A1 | 10/2017 | Nuernberger et al. |
| 2017/0323482 A1 | 11/2017 | Coup et al. |
| 2017/0345089 A1* | 11/2017 | Wu .................... G06T 19/00 |
| 2018/0033208 A1 | 2/2018 | Martin |
| 2018/0095616 A1 | 4/2018 | Valdivia et al. |
| 2018/0096519 A1 | 4/2018 | Tokubo |
| 2018/0114353 A1 | 4/2018 | Champion et al. |
| 2018/0122043 A1 | 5/2018 | Energin et al. |
| 2018/0123813 A1 | 5/2018 | Milevski et al. |
| 2018/0144458 A1 | 5/2018 | Xu et al. |
| 2018/0144547 A1 | 5/2018 | Shakib et al. |
| 2018/0173404 A1 | 6/2018 | Smith |
| 2018/0174367 A1 | 6/2018 | Marom et al. |
| 2018/0225885 A1 | 8/2018 | Dishno |
| 2018/0247446 A1 | 8/2018 | Litvin |
| 2018/0307303 A1 | 10/2018 | Powderly et al. |
| 2019/0043269 A1 | 2/2019 | Lin et al. |
| 2019/0197599 A1 | 6/2019 | Zia et al. |
| 2019/0197768 A1 | 6/2019 | Taylor et al. |
| 2019/0279428 A1 | 9/2019 | Mack et al. |
| 2019/0311488 A1* | 10/2019 | Sareen ................. G06T 7/60 |
| 2019/0311548 A1 | 10/2019 | Wang et al. |
| 2019/0313059 A1 | 10/2019 | Agarawala et al. |
| 2019/0325644 A1 | 10/2019 | Bleyer et al. |
| 2019/0362312 A1 | 11/2019 | Platt et al. |
| 2019/0392643 A1 | 12/2019 | Busto et al. |
| 2020/0027194 A1 | 1/2020 | Nourai et al. |
| 2020/0051336 A1 | 2/2020 | Ichikawa et al. |
| 2020/0051338 A1 | 2/2020 | Zia et al. |
| 2020/0066046 A1 | 2/2020 | Stahl et al. |
| 2020/0226820 A1 | 7/2020 | Stachniak et al. |
| 2020/0368616 A1 | 11/2020 | Delamont |
| 2021/0110560 A1 | 4/2021 | Knorr et al. |
| 2021/0118239 A1 | 4/2021 | Santesteban et al. |
| 2021/0125414 A1 | 4/2021 | Berkebile |
| 2021/0134000 A1 | 5/2021 | Malisiewicz et al. |
| 2021/0233303 A1 | 7/2021 | Takahashi |
| 2021/0241480 A1 | 8/2021 | Yan et al. |
| 2022/0327783 A1* | 10/2022 | El-Ghoroury ........... G06T 19/00 |
| 2022/0413433 A1 | 12/2022 | Parra Pozo et al. |
| 2023/0196599 A1 | 6/2023 | Tao et al. |
| 2023/0236545 A1 | 7/2023 | Yu et al. |
| 2023/0298280 A1 | 9/2023 | Jouet et al. |
| 2023/0350344 A1 | 11/2023 | Wen et al. |
| 2024/0046590 A1 | 2/2024 | Booth et al. |
| 2024/0062472 A1 | 2/2024 | Herling et al. |
| 2024/0119680 A1 | 4/2024 | Gunnarsson et al. |
| 2024/0119690 A1 | 4/2024 | Ocampo et al. |
| 2024/0219732 A1 | 7/2024 | Miyairi et al. |
| 2024/0249489 A1 | 7/2024 | Olivier et al. |
| 2024/0320917 A1 | 9/2024 | Saito et al. |
| 2024/0371112 A1 | 11/2024 | Rao et al. |
| 2025/0037385 A1 | 1/2025 | Herling et al. |
| 2025/0069334 A1 | 2/2025 | Nguyen et al. |

FOREIGN PATENT DOCUMENTS

| | | |
|---|---|---|
| CN | 106951882 B | 3/2021 |
| EP | 3945486 A1 | 2/2022 |
| WO | 2022017779 A2 | 1/2022 |

OTHER PUBLICATIONS

Coster; "The Effects of Shadows on Depth Perception in Augmented Reality on a Mobile Device," Degree Project in Computer Science and Engineering, Royal Institute of Technology, School of Electrical Engineering and Computer Science (EECS), Apr. 24, 2019, 16 pages.

Hawkes R., et al., "Update Rates and Fidelity in Virtual Environments," Virtual Reality, 1995, vol. 1, No. 2, pp. 99-108, Retrieved from the Internet URL: https://link.springer.com/article/10.1007/BF02009726.

International Search Report and Written Opinion for International Application No. PCT/US2019/017947, mailed Nov. 28, 2019, 17 Pages.

International Search Report and Written Opinion for International Application No. PCT/US2024/036987, mailed Oct. 9, 2024, 13 pages.

(56) References Cited

OTHER PUBLICATIONS

Irawati; et al., "Spatial Ontology for Semantic Integration in 3D Multimodal Interaction Framework," VRCIA, Hong Kong, ACM, Jun. 14-17, 2006, p. 129-135.
Non-Final Office Action mailed Apr. 28, 2025 for U.S. Appl. No. 18/313,185, filed May 5, 2023, 14 pages.
Office Action mailed Jun. 28, 2024 for Chinese Application No. 201910105998.4, filed Jan. 18, 2019, 6 pages.
Popovic M., et al., "Grasping Unknown Objects Using an Early Cognitive Vision System for General Scene Understanding," IEEE-RSJ International Conference on Intelligent Robots and Systems, 2011, 8 Pages.

\* cited by examiner

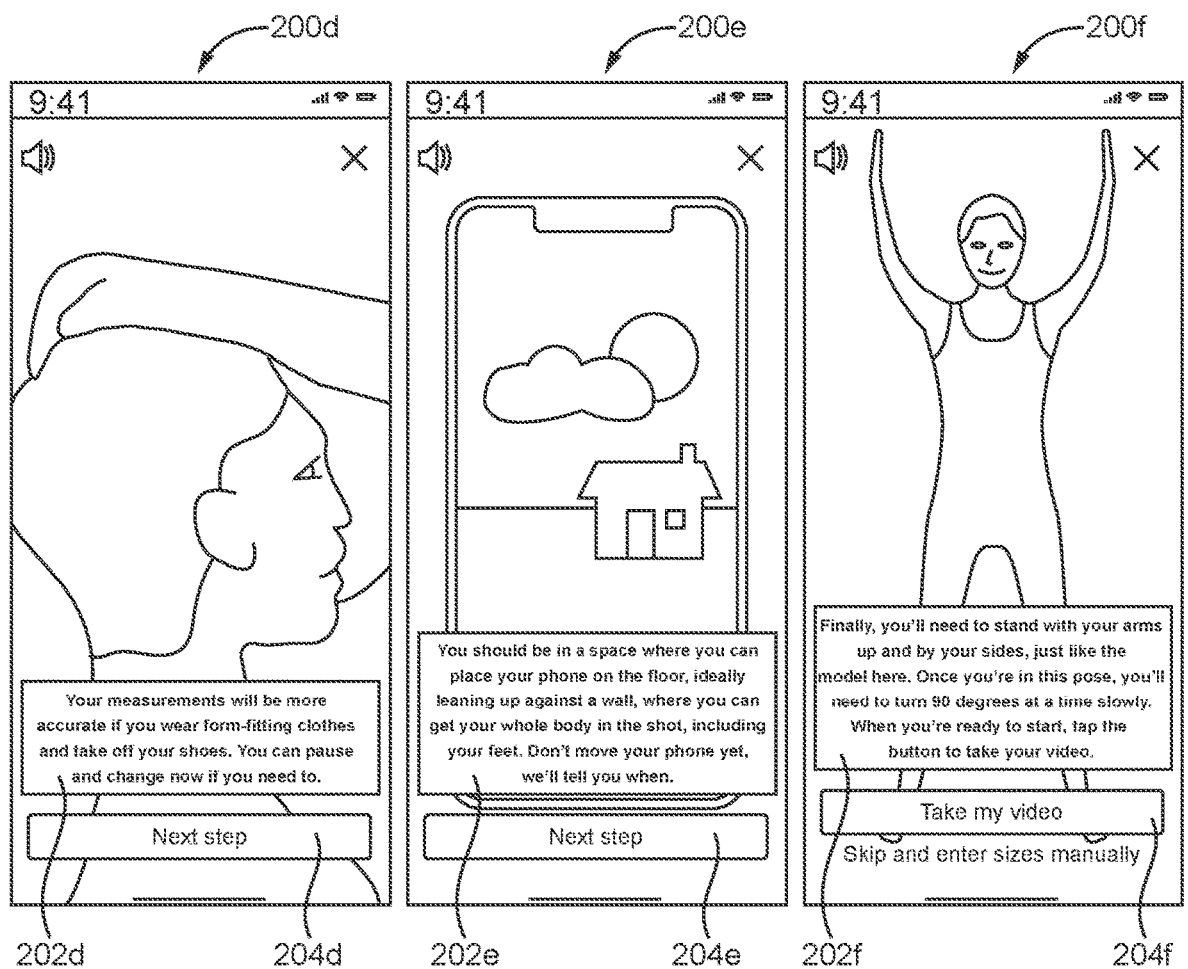

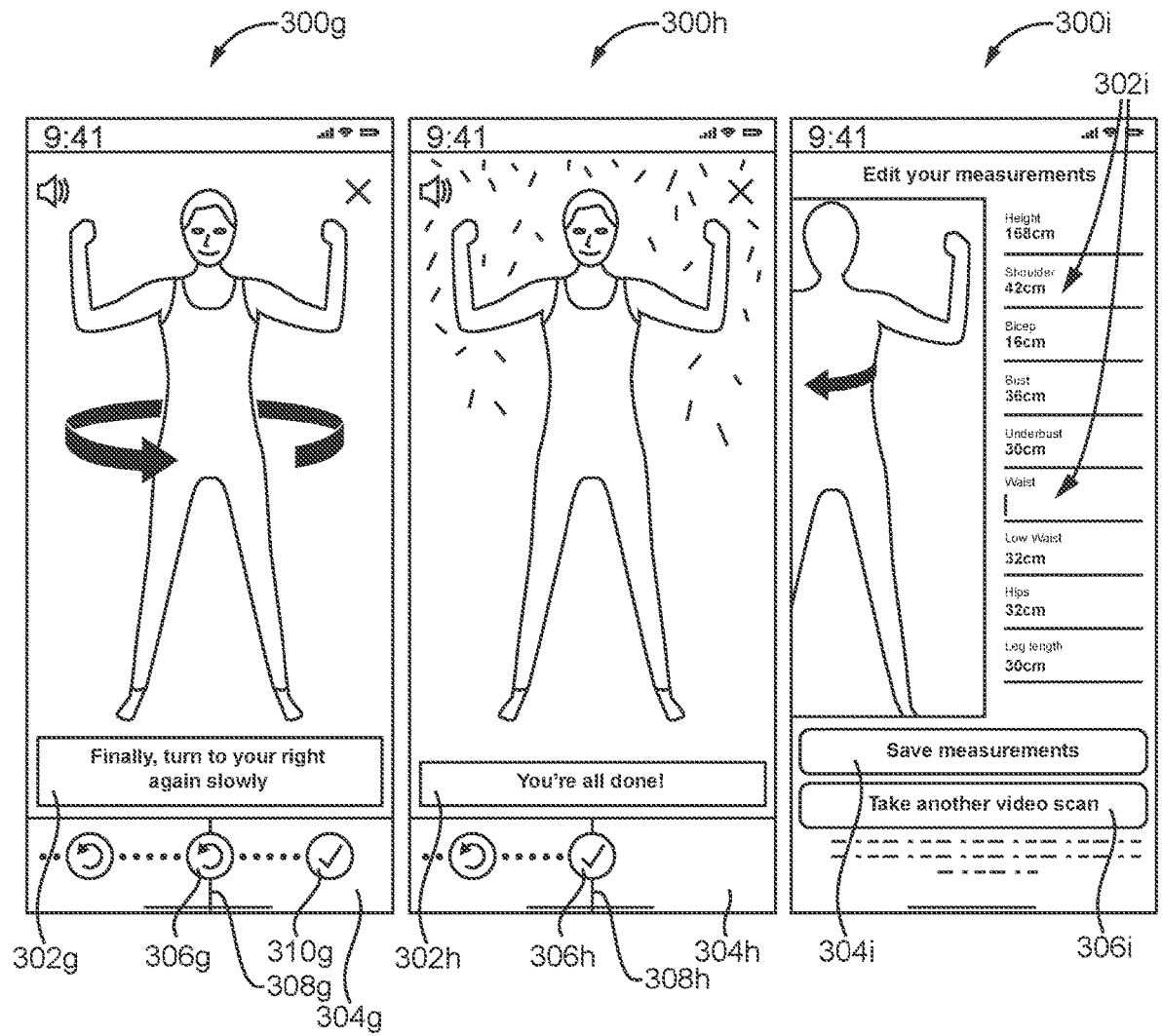

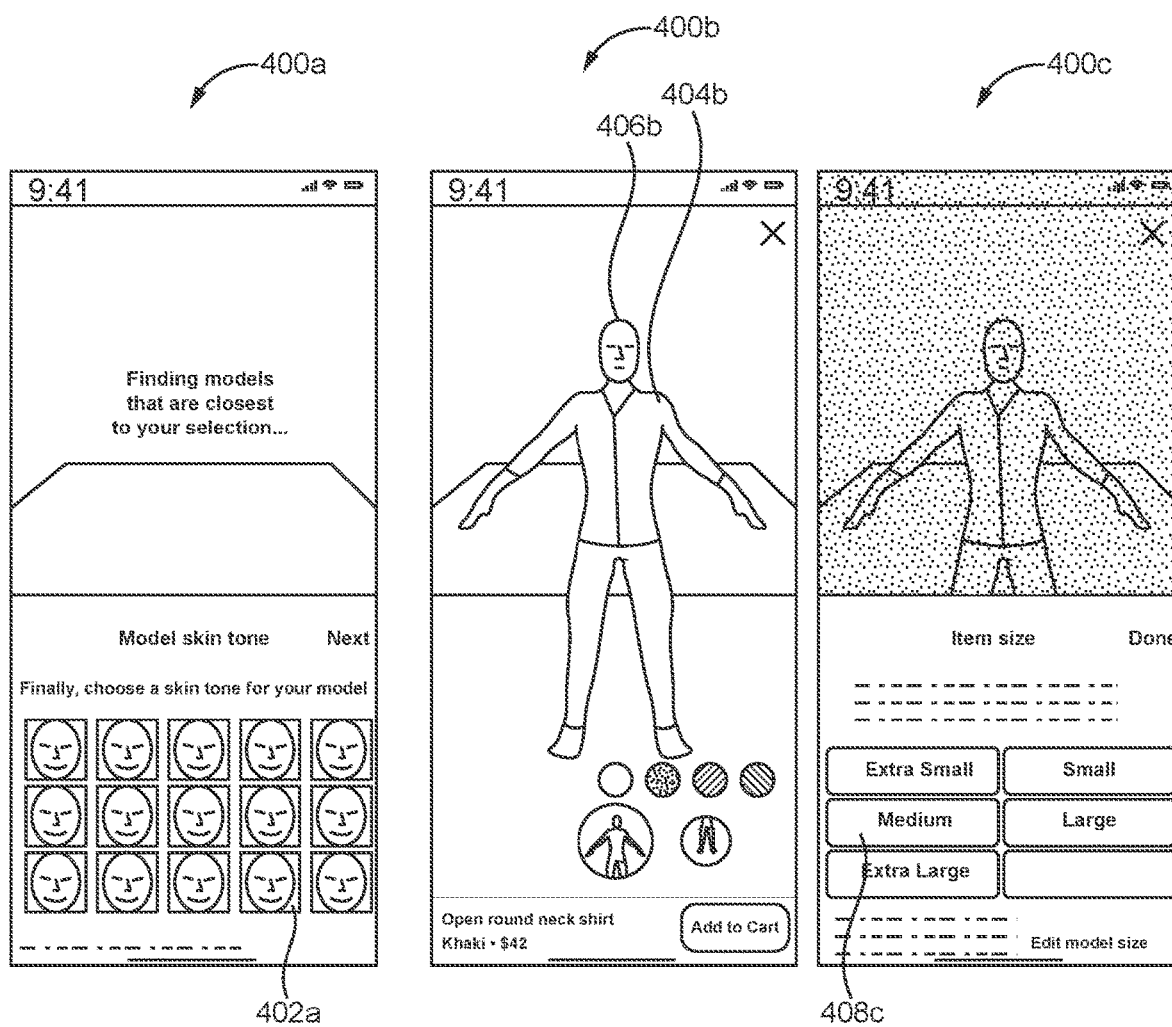

HUMAN BODY SCANNING FOR SIZE RECOMMENDATION

CROSS REFERENCE TO RELATED APPLICATIONS

This application claims priority under 35 U.S.C. § 119(e) to U.S. patent application Ser. No. 63/404,471 filed Sep. 7, 2022, the disclosures of which applications are incorporated by reference herein, in their entirety, for all purposes.

TECHNICAL FIELD

The present disclosure generally relates to human body scanning, and more particularly to human body scanning for size recommendation.

BACKGROUND

Body scanning may describe various technologies used to measure a human body to create three-dimensional 3D computer representation of the human body. Body scanning has been used in a variety of applications including creating avatar representations of actual people, adapted performance sportswear, fashion design (e.g., garments, accessories), 3D printed figurines, 3D morphometric evaluation (e.g., for weight-loss purposes), ergonomic body measurement, 3D body measurement, body shape classification, comparison of changes in body positions, and/or other applications.

BRIEF SUMMARY

The subject disclosure provides for systems and methods for human body scanning. A user is allowed to obtain a full body scan of themselves using their mobile device. For example, an image of the front of their body and an image of a side or profile of their body can be obtained using a camera on their mobile device to generate a three-dimensional virtual representation of their body, such as for "trying on" virtual clothes with accurate relative dimensions between the virtual representation of their body and the virtual clothes.

One aspect of the present disclosure relates to a method for human body scanning for size recommendation. The method may include receiving a request to perform a self-guided body scan. The method may include, in response to receiving the request, initiating a body scanning process including at least a front scan and a side scan. The method may include receiving the front scan and the side scan. The method may include generating a size recommendation based at least in part on the front scan and the side scan. The method may include causing display of the size recommendation through a user interface.

Another aspect of the present disclosure relates to a system configured for human body scanning for size recommendation. The system may include one or more hardware processors configured by machine-readable instructions. The processor(s) may be configured to receive a selection of clothing to virtually try on. The processor(s) may be configured to receive a request to perform a self-guided body scan. The processor(s) may be configured to, in response to receiving the request, initiate a body scanning process including at least a front scan and a side scan. The processor(s) may be configured to receive the front scan and the side scan. The processor(s) may be configured to generate a size recommendation based at least in part on the front scan and the side scan. The processor(s) may be configured to cause display of the size recommendation through a user interface. The processor(s) may be configured to store the size recommendation.

Yet another aspect of the present disclosure relates to a non-transient computer-readable storage medium having instructions embodied thereon, the instructions being executable by one or more processors to perform a method for human body scanning for size recommendation. The method may include receiving a selection of clothing to virtually try on. The method may include receiving a request to perform a self-guided body scan. The method may include, in response to receiving the request, initiating a body scanning process including at least a front scan and a side scan. The method may include receiving the front scan and the side scan. The method may include generating a size recommendation based at least in part on the front scan and the side scan. The method may include causing display of the size recommendation through a user interface. The method may include generating a preview comprising the selected clothing based on the size recommendation. The method may include receiving a request to purchase an item of clothing based on the size recommendation.

Still another aspect of the present disclosure relates to a system configured for human body scanning for size recommendation. The system may include means for receiving a request to perform a self-guided body scan. The system may include means for, in response to receiving the request, initiating a body scanning process including at least a front scan and a side scan. The system may include means for receiving the front scan and the side scan. The system may include means for generating a size recommendation based at least in part on the front scan and the side scan. The system may include means for causing display of the size recommendation through a user interface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 2A, 2B, 2C, 2D, 2E, and 2F illustrate example views of an application providing pre-scan instructions to a user, in accordance with one or more implementations.

FIGS. 3A, 3B, 3C, 3D, 3E, 3F, 3G, 3H, and 3I illustrate example views of an application for capturing a body scan using a mobile phone or other mobile device, in accordance with one or more implementations.

FIGS. 4A, 4B, and 4C illustrate example views of an application providing post-scan processes for customizing a three-dimensional representation of a user's body, selecting a garment, and receiving a size recommendation, in accordance with one or more implementations.

Figure 1A:
FIGS. 1A, 1B, and 1C illustrate example views of an application in which an accurately reconstructed three-dimensional body is fitted with virtual representation of a garment, in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Conventional approaches for body scanning often involve complicated and computationally intensive technologies such as structured-light 3D scanners, 3D depth sensing, and stereoscopic vision for anthropometric investigation of the human. Thus, key limitations of existing 3D body scanning include upfront costs of equipment and the skills required to collect data and apply it to relevant fields.

The subject disclosure provides for systems and methods for human body scanning. A user is allowed to obtain a full body scan of themselves using their mobile device. For example, an image of the front of their body and an image of a side or profile of their body can be obtained using a camera on their mobile device to generate a three-dimensional virtual representation of their body, such as for "trying on" virtual clothes with accurate relative dimensions between the virtual representation of their body and the virtual clothes.

Implementations described herein address the aforementioned shortcomings and other shortcomings by providing 3D body-scanning technology that can help users accurately capture their body using mobile phones, reconstruct in 3D, produce apparel sizing measurements, and make brand specific personalized size recommendations. Exemplary implementations may facilitate visualizing fit and style on an accurately reconstructed 3D body.

Exemplary implementations may help users find the right size clothing. Size inconsistency across brands may be one of the user's biggest concerns shopping online. For example, between 30% and 50% of shoppers buy items in multiple sizes due to their distrust in sizing charts or fit finders. Online clothing return rates have been reported at approximately 40% compared to only 10% for in-store purchases. Retailers lose an estimated $600B or more annually on returns. Shoppers may try to solve this problem by searching for sizing tables for a given brand, and use model size reference annotated on images. User size information may be collected for brand specific size charts.

Exemplary implementations may provide a three-dimensional (3D) body-scanning technology that can help users accurately capture their body using mobile phones, reconstruct their body as a 3D virtual representation, produce apparel sizing measurements, and/or make brand specific personalized size recommendations. The 3D virtual representation and/or its associate measurements may be leveraged in later clothing releases to visualize fit and style.

Some implementations may provide user controls to permanently delete any biometric and associated data from user devices and/or any servers used in the processes described herein. Data collection may be reduced by limiting and/or anonymizing data being sent from user devices to servers. In some implementations, all data processing may be performed on user devices. Biometric information such as faces may not be required for body capture process disclosed herein such that all the images and/or videos can be censored (e.g., via blurring) immediately after being captured.

Figure 1B:
Figure 1C:
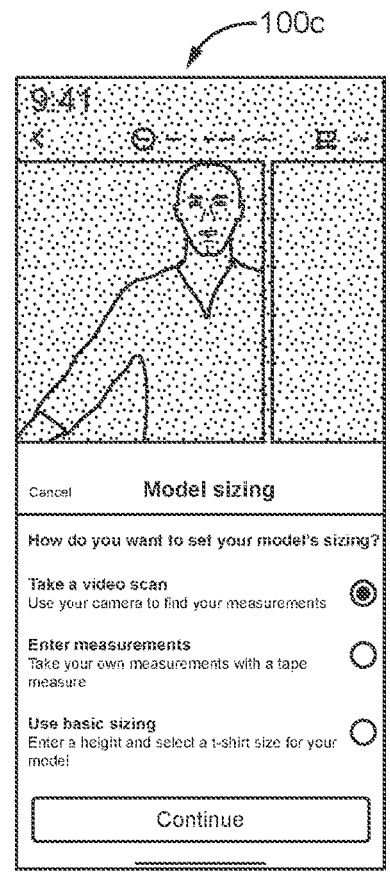
Figures 2A, 2B, 2C:
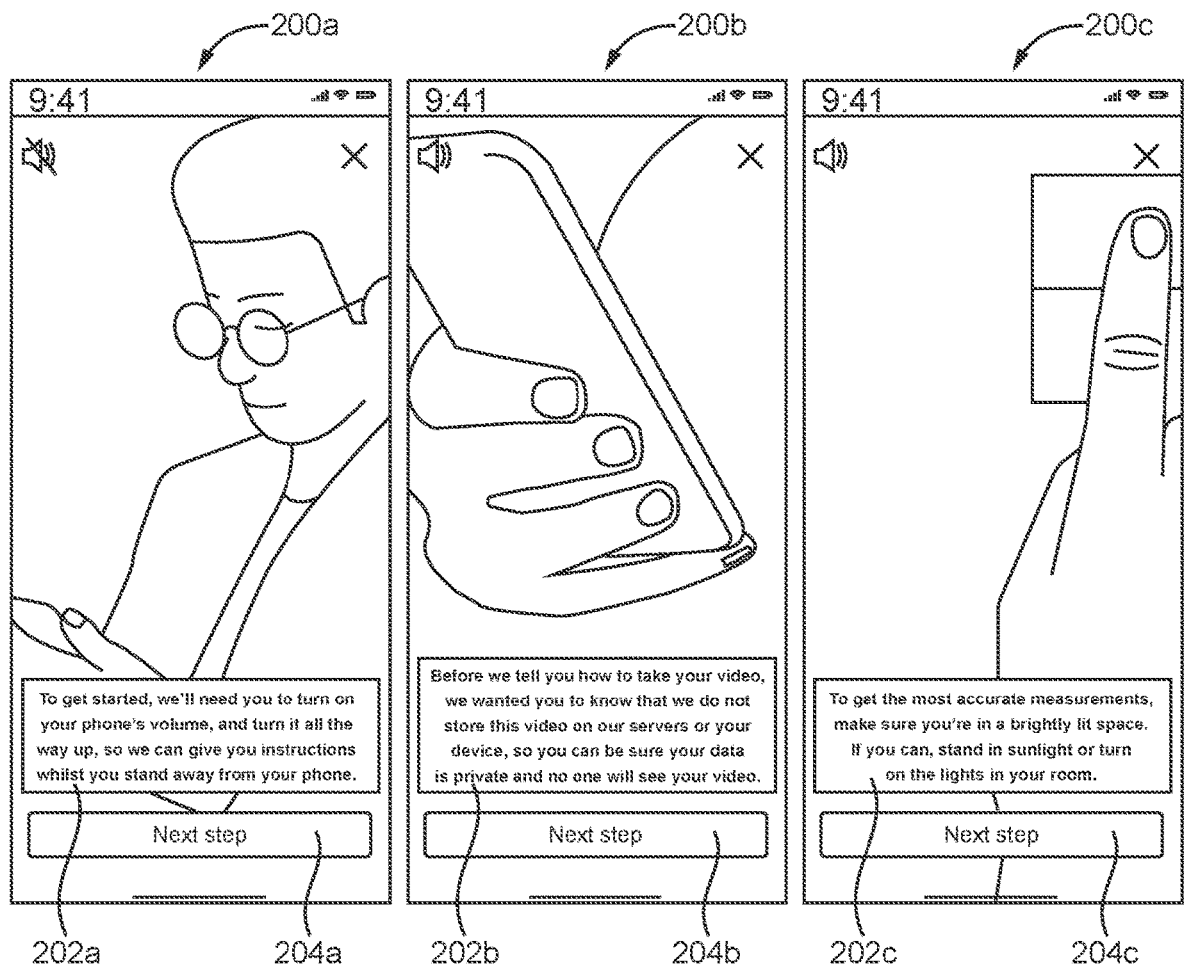

FIGS. 1A, 1B, and 1C illustrate example views 100a, 100b, and 100c, respectively, of an application in which an accurately reconstructed three-dimensional body is fitted with virtual representation of a garment, in accordance with one or more implementations. As a non-limiting illustrative example, a user may be watching television while scrolling through a social media feed on the user's mobile device. The user may see an influencer wearing a nice pair of jeans, and may tap in to see details (see, e.g., view 100a in FIG. 1A). The user may rotate the images to see how the jeans look from different angles. The user may be really pleased with the style of the jeans but may be unfamiliar with the specific brand and may be unsure as to what size would fit best. The user may notice a "size me" button on their mobile device (see, e.g., view 100b in FIG. 1B) and may follow instructions to complete a self-guided body scan (see, e.g., view 100c in FIG. 1C). The user may opt in to storing her tailor measurements for future size recommendations. A few seconds later, an interstitial may appear showing 26-inch size waist, 28-inch length, with a slim-fit styling for a tighter fit. To build more confidence, the user may swipe through jeans from other brands. As the user views them, the user may receive brand specific personalized size recommendations. After a few minutes of browsing around, the user may confidently decide to purchase the jeans in the recommended size.

FIGS. 2A, 2B, 2C, 2D, 2E, and 2F illustrate example views 200a, 200b, 200c, 200d, 200e, and 200f, respectively, of an application providing pre-scan instructions to a user, in accordance with one or more implementations. In some implementations, the user may be guided through a body capture process via an experience using real-time technologies that ensure data captured is optimal (e.g., distance to camera, body posture, lighting, etc.). The user may receive visual and audio instructions about minimum requirements on one or more of clothes to wear, lighting, hair, background, presence of other objects or people during the scan process, and/or other information relevant to body scanning.

Views 200 may provide information to the user via a display of the user's mobile device. In view 200a of FIG. 2A, prompt 202a may provide instructions regarding a volume setting of the user's mobile device. A button 204a may be tapped or clicked to advance to the next view. In view 200b of FIG. 2B, prompt 202b may provide instructions regarding privacy and data handling associated with images and/or videos obtained during a body scan of a user. A button 204b may be tapped or clicked to advance to the next view. In view 200c of FIG. 2C, prompt 202c may provide instructions regarding lighting in the user's environment during a body scan of the user. A button 204c may be tapped or clicked to advance to the next view. In view 200d of FIG. 2D, prompt 202d may provide instructions regarding clothing worn by the user during a body scan of the user. A button 204d may be tapped or clicked to advance to the next view. In view 200e of FIG. 2E, prompt 202e may provide instructions regarding placement of the user's mobile device during a body scan of the user. A button 204e may be tapped or clicked to advance to the next view. In view 200f of FIG. 2F, prompt 202f may provide instructions regarding a position and/or pose of the user during a body scan of the user. A button 204f may be tapped or clicked to advance to the next view.

FIGS. 3A, 3B, 3C, 3D, 3E, 3F, 3G, 3H, and 3I illustrate example views 300a, 300b, 300c, 300d, 300e, 300f, 300g, 300h, and 300i, respectively, of an application for capturing a body scan using a mobile phone or other mobile device, in accordance with one or more implementations. In some implementations, during a body scan, the user may be informed when one or more of the user's mobile device is not positioned correctly (e.g., not placed at a correct angle on the floor), the user's full body is not in view via the camera of the mobile device, the user is not positioned and/or performing a pose correctly, the user is facing the wrong direction, and/or other feedback to the user to improve results of the body scan.

Views 300 may provide information to the user via a display of the user's mobile device. In view 300a of FIG. 3A, prompt 302a may provide instructions regarding correctly positioning the user device and beginning the scan. Scan sequence indicator 304a may allow the user to begin the body scan by tapping or clicking a button 306a.

Figures 3A, 3B, 3C:
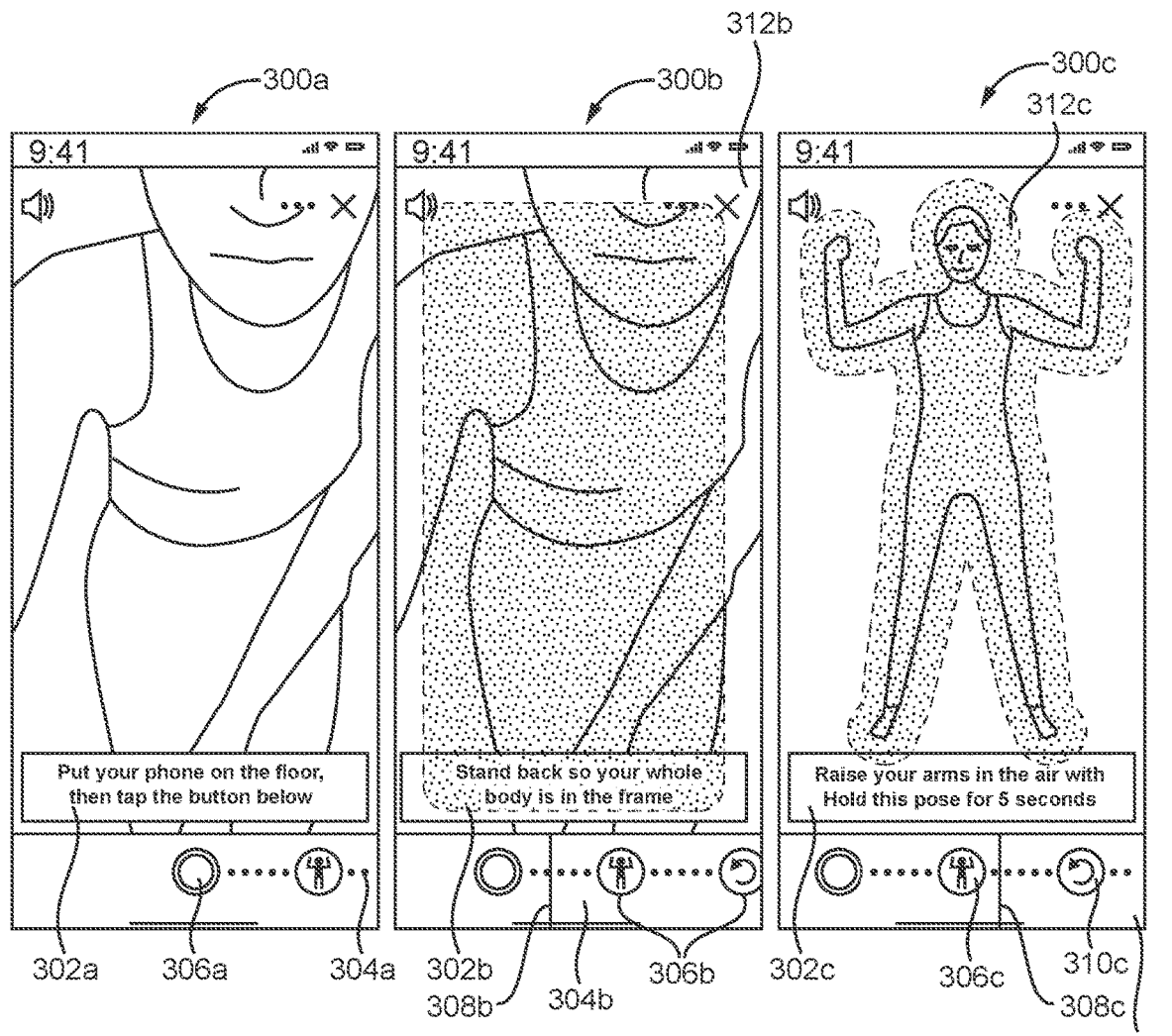

In view 300b of FIG. 3B, prompt 302b may provide instructions regarding how the user should position their body within a frame (e.g., frame 312b) taken by a camera of the user's mobile device. A scan sequence indicator 304b may show a state of the body scan process. Milestones 306b may indicate actions to be taken by the user and/or actions taken via the user's mobile device. As milestones 306b pass from right to left during the scan and within the scan sequence indicator 304b, a current milestone 306b may be indicated by coinciding with a midpoint 308b of the scan sequence indicator 304b.

In view 300c of FIG. 3C, prompt 302c may provide instructions regarding holding a first pose (e.g., by positioning the user's body within outline 312c) for a period of time (e.g., five seconds or other duration). A scan sequence indicator 304c may show a milestone 306c (e.g., representing the beginning of the first pose) having passed from right to left by midpoint 308c. A distance between milestone 306c and milestone 310c may represent the period of time (e.g., 5 seconds or other duration) during which the user should hold the first pose.

Figures 3D, 3E, 3F:
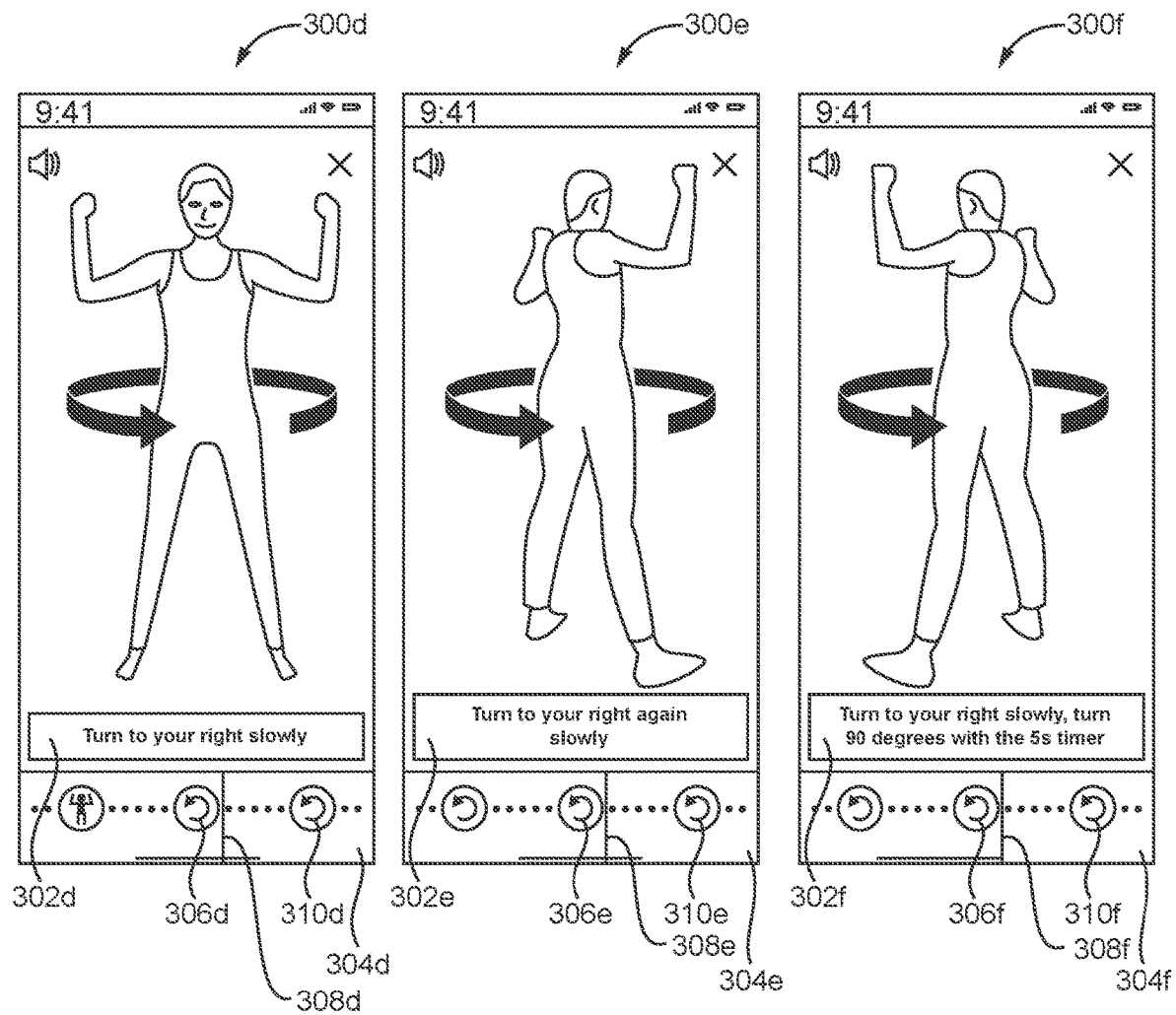

In view 300d of FIG. 3D, prompt 302d may provide instructions regarding the user rotating their body (e.g., by 90 degrees, 180 degrees, 270 degrees, 360 degrees, or other angles). A scan sequence indicator 304d may show a milestone 306d (e.g., representing the end of the first pose and rotating the user's position) having passed from right to left by midpoint 308d. A distance between milestone 306d and milestone 310d may represent the period of time (e.g., 5 seconds or other duration) during which the user should be rotating their body to a new position (e.g., from front of the user's body facing the camera to a side of the user's body facing the camera).

In view 300e of FIG. 3E, prompt 302e may provide instructions regarding continuing rotation of the user's body. A scan sequence indicator 304e may show a milestone 306e (e.g., representing rotating the user's position) having passed from right to left by midpoint 308e. A distance between milestone 306e and milestone 310e may represent the period of time (e.g., 5 seconds or other duration) during which the user should be rotating their body to a new position (e.g., from a first side of the user's body facing the camera to the back of the user's body facing the camera).

In view 300f of FIG. 3F, prompt 302f may provide instructions regarding continuing rotation of the user's body. A scan sequence indicator 304f may show a milestone 306f (e.g., representing rotating the user's position) having passed from right to left by midpoint 308f. A distance between milestone 306f and milestone 310f may represent the period of time (e.g., 5 seconds or other duration) during which the user should be rotating their body to a new position (e.g., from the back of the user's body facing the camera to a second side of the user's body facing the camera).

In view 300g of FIG. 3G, prompt 302g may provide instructions regarding continuing rotation of the user's body. A scan sequence indicator 304g may show a milestone 306g (e.g., representing rotating the user's position) having passed from right to left by midpoint 308g. A distance between milestone 306g and milestone 310g may represent the period of time (e.g., 5 seconds or other duration) during which the user should be rotating their body to a new position (e.g., from a second side of the user's body facing the camera to the front of the user's body facing the camera).

In view 300h of FIG. 3H, prompt 302h may provide an indication regarding the body scan being finished. A scan sequence indicator 304h may show a milestone 306h (e.g., representing completion of the scan) having arrived from the right at midpoint 308h.

In view 300i of FIG. 3I, measurements 302i from the body scan may be presented to the user. The result of the body scan may be used to estimate tailor measurements of the user's body. Some implementations may facilitate the user editing the measurements 302i. A first button 304i may be tapped or clicked to save the measurements (e.g., to facilitate size recommendations). A second button 306i may be tapped or clicked to perform a new body scan.

FIGS. 4A, 4B, and 4C illustrate example views 400a, 400b, and 400c, respectively, of an application providing post-scan processes for customizing a three-dimensional representation of a user's body, selecting a garment, and receiving a size recommendation, in accordance with one or more implementations. In view 400a of FIG. 4A, the user may customize an appearance of the three-dimensional representation of a user's body. For example, the user may select one or more appearance attributes including one or more of a skin tone (e.g., by clicking or tapping one or more examples 402a), a hair style, a facial appearance and/or expression, and/or other appearance attributes. In view 400b of FIG. 4B, the user may select a garment 404b and view it as modeled (e.g., being worn) by the three-dimensional representation 406b of a user's body. In some implementations, the user may select different colors of the garment and/or views of the three-dimensional representation 406b of a user's body. In view 400c of FIG. 4C, one or more size recommendations 408c (e.g., for the garment 404b selected in view 400b of FIG. 4B). In some implementations, the user may edit the model size (e.g., edit dimensions of the three-dimensional representation 406b of a user's body).

Figure 5:
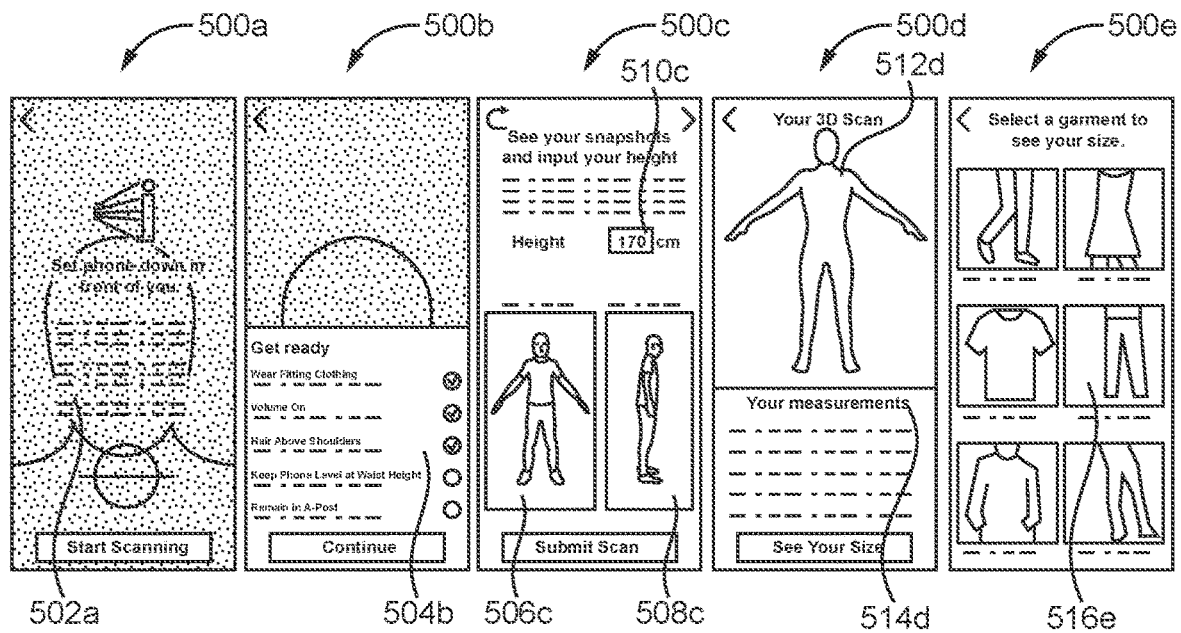
FIG. 5 illustrates example views of an application for making brand specific personalized garment size recommendations, in accordance with one or more implementations.

FIG. 5 illustrates example views 500a, 500b, 500c, 500d, and 500e of an application for making brand specific personalized garment size recommendations, in accordance with one or more implementations. View 500a may provide instructions 502a for positioning the user's mobile device in order to perform a body scan. View 500b may provide a pre-scan checklist 504b for improving results and/or accuracy of a body scan. View 500c may provide instructions to review a front view image 506c and a right-side view image 508c of the user's body obtained during a body scan. The user may define and/or edit their height through field 510c. View 500d may provide a visualization 512d of a three-dimensional representation of the user's body with a summary 514d of measurements obtained through the body scan. View 500e may provide images 516e of one or more garments in sizes recommended for the user based on the body scan. The size recommendations may be based on one or more of brand size charts, calculated tailor measurements, and/or other information. The size recommendations may be based on one or more of information about the user (e.g., their fit preference, purchase history), a specific garment (e.g., returns), and/or other information to make the size recommendation more relevant. Some implementations may include a fit visualization to help users better understand fit preferences.

Figure 6:
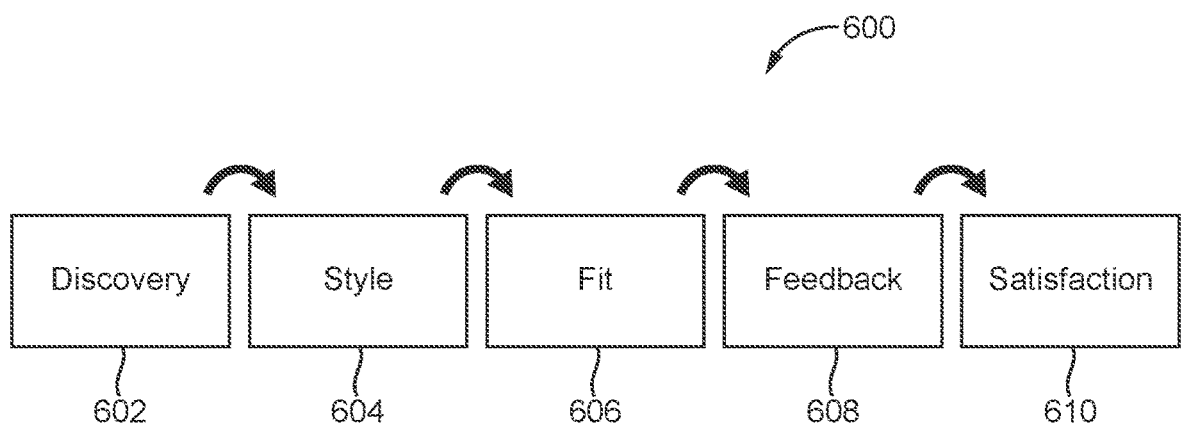
FIG. 6 illustrates an example sequence for obtaining brand specific personalized garment size recommendations, in accordance with one or more implementations.

FIG. 6 illustrates an example sequence 600 for obtaining brand specific personalized garment size recommendations, in accordance with one or more implementations. Users may be inspired by a fashion item they see others wearing (e.g., discovery; see 602) on digital surfaces (e.g., social media via a mobile device) or in real life. Once discovered, the users want to determine whether the item satisfies their fashion sense and preferences (e.g., style; see 604) and is well suited for their body (e.g., fit; see 606). The users may then want to seek the advice (e.g., feedback; see 608) of the people they trust to decide whether a product is right for them. Finally, they may purchase the product and decide to keep or return it after trying them on (e.g., satisfaction, post-purchase; see 610). Fit may be users' biggest concern when purchasing clothing online. There are no widely accepted standards for apparel sizing because of cost, different body shapes, demographic factors such as race, age, or nationality, and brands' own sizing standards shaped by their target demographic and markets. Exemplary implementations overcome these and other challenges.

Figure 7:
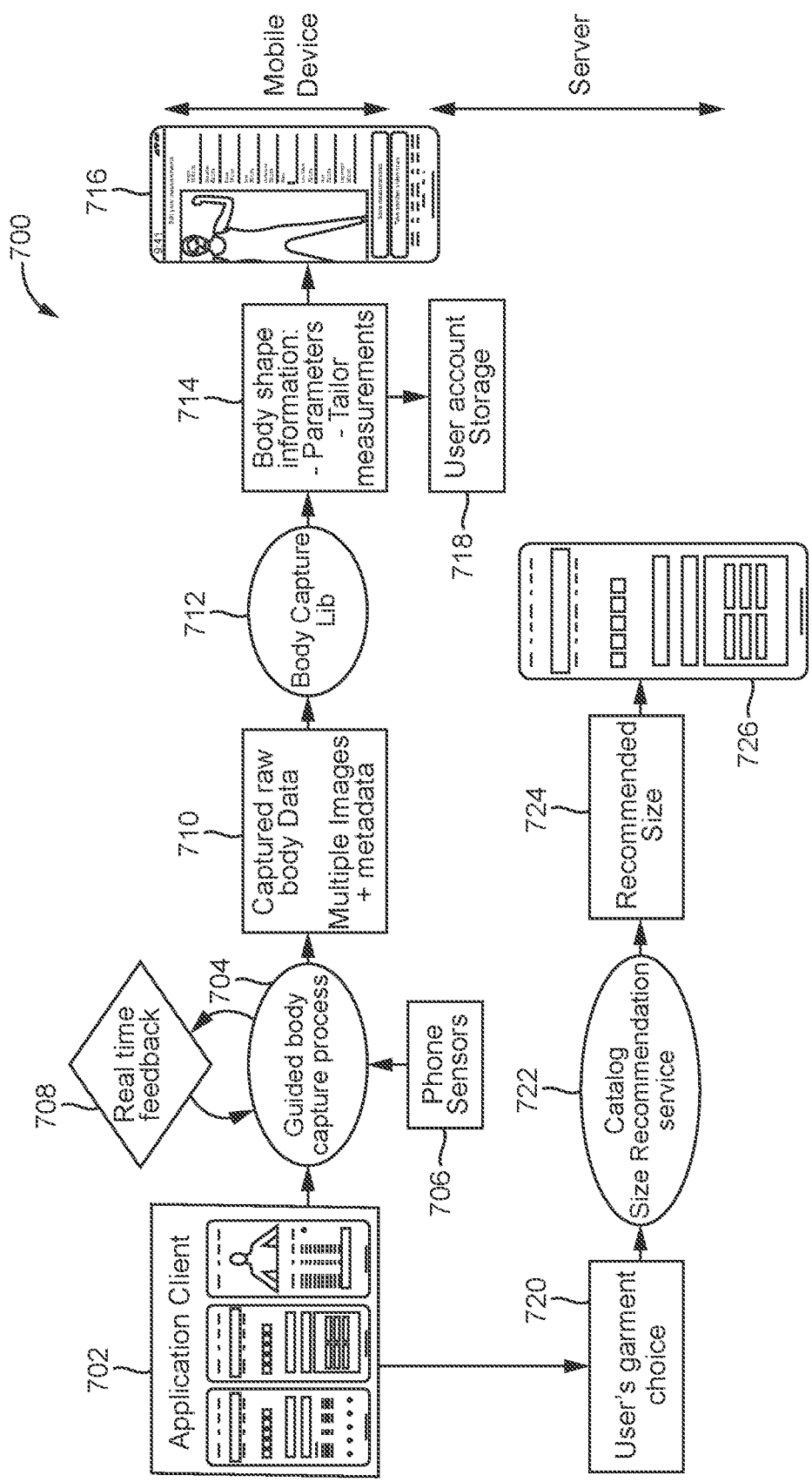
FIG. 7 illustrates an example flow diagram for human body scanning for size recommendation, in accordance with one or more implementations.

FIG. 7 illustrates an example flow diagram 700 for human body scanning for size recommendation, in accordance with one or more implementations. Some implementations may include a system architecture in which all the computation necessary for body scan capture is performed on the user's mobile device. Thus, the body shape parameters (e.g., user's body measurements) may be computed directly on the mobile device. The body shape parameters may be sent to a server to be stored on the user's account. According to some implementations, no image data is sent from the mobile device to the server.

In some implementations, the processing associated with a body scan may be split between the user's mobile device and one or more servers. For example, lightweight parts of the body scan process may be performed on the user's mobile device in order to extract features (e.g., body shape, proportions, and/or measurements) from the input images. These features may be uploaded to a server in order to run heavier compute (e.g., computations requiring graphics processing units (GPUs)) and generate output tailor measurements.

Referring FIG. 7, at step 702, an application client may be running on a user's mobile device through which the user may select a garment, indicate they want to be fitted using a body scan, and receive instructions for the body scan. At step 704, the user may be guided through a body capture or body scan process. At step 706, phone sensors may provide information to the scanning process such that, at step 708, real time feedback can be provided to the user (e.g., to ensure the body scan is being performed properly). At step 710, raw body data may be captured along with multiple images and metadata of the user's body, which is sent to a body capture library at step 712. At step 714, body shape information may be determined (e.g., parameters, tailor measurements, etc.). At step 716, a summary of body measurements is provided to the user via display on their mobile device. At step 718, body shape information and body measurements may be stored in the user's account. At step 720, the user's selected garment may be received by a server and, at step 722, sent to a catalog to facilitate determining one or more size recommendations. At step 724, a size recommendation may be determined. At step 726, the size recommendation may be provided to the user via display on their mobile device.

Figure 8A:
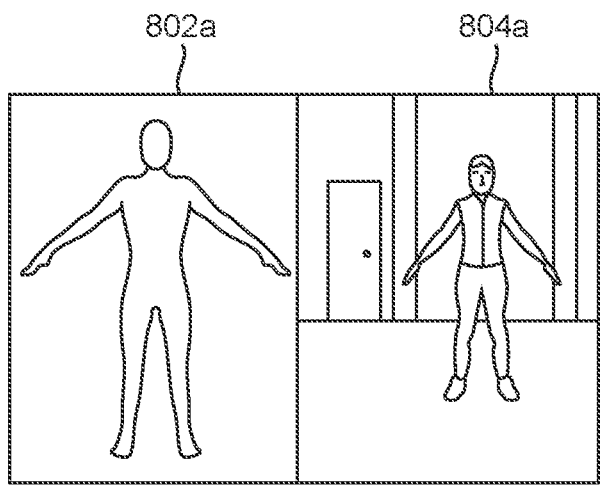
FIGS. 8A, 8B, 8C, and 8D illustrate example qualitative results obtained using one or more implementations.
Figure 8B:
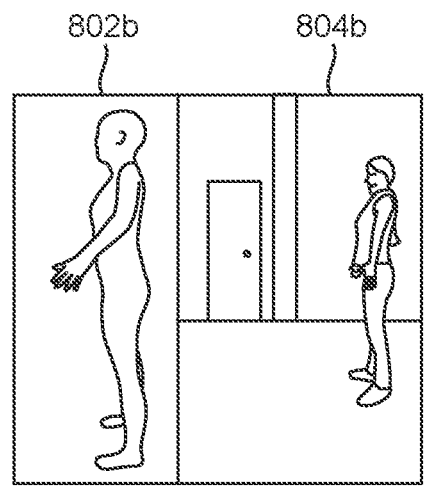
Figure 8C:
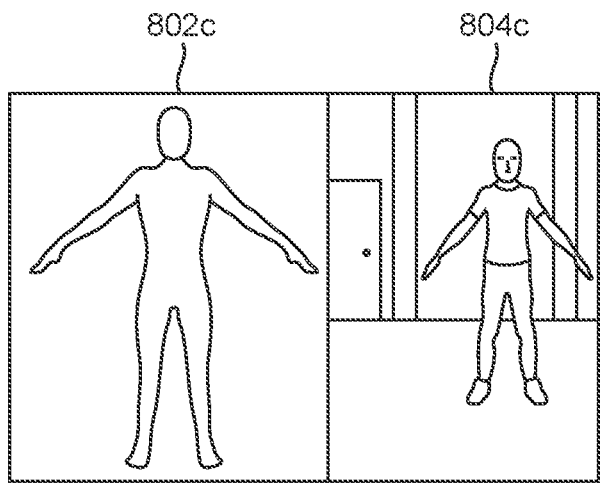
Figure 8D:
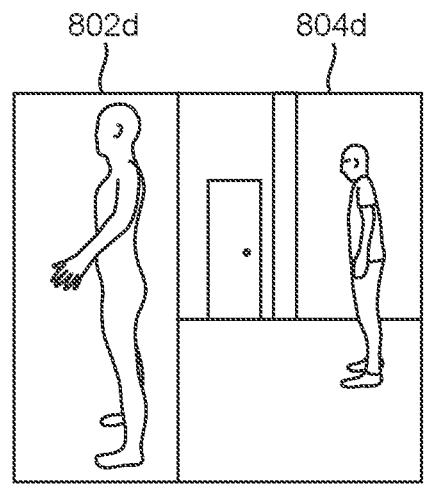

FIGS. 8A, 8B, 8C, and 8D illustrate example qualitative results obtained using one or more implementations. FIG. 8A shows a front view 802a of a three-dimensional virtual body representation beside a corresponding front view 804a of a user obtained during a body scan using implementations described herein. FIG. 8B shows a side view 802b of a three-dimensional virtual body representation beside a corresponding side view 804b of a user obtained during a body scan using implementations described herein. FIG. 8C shows a front view 802c of a three-dimensional virtual body representation beside a corresponding front view 804c of a user obtained during a body scan using implementations described herein. FIG. 8D shows a side view 802d of a three-dimensional virtual body representation beside a corresponding side view 804d of a user obtained during a body scan using implementations described herein.

The disclosed system(s) address a problem in traditional human body scanning techniques tied to computer technology, namely, the technical problem of using a mobile device to obtain a full-body scan of a user in a simple and intuitive manner. The disclosed system solves this technical problem by providing a solution also rooted in computer technology, namely, by providing for human body scanning for size recommendation. The disclosed subject technology further provides improvements to the functioning of the computer itself because it improves processing and efficiency in human body scanning.

Figure 9:
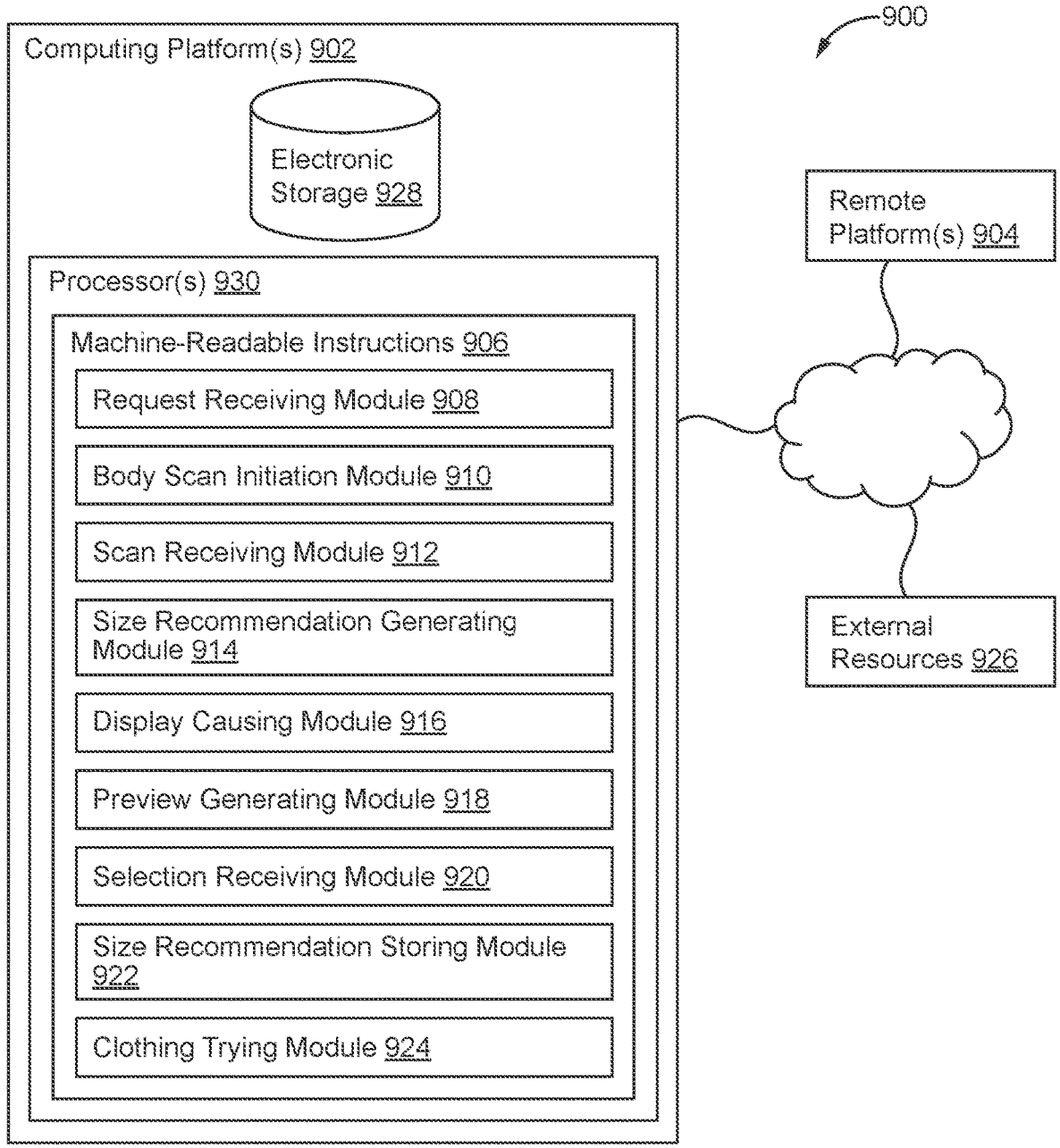
FIG. 9 illustrates a system configured for human body scanning, in accordance with one or more implementations.

FIG. 9 illustrates a system 900 configured for human body scanning, according to certain aspects of the disclosure. In some implementations, system 900 may include one or more computing platforms 902. Computing platform(s) 902 may be configured to communicate with one or more remote platforms 904 according to a client/server architecture, a peer-to-peer architecture, and/or other architectures. Remote platform(s) 904 may be configured to communicate with other remote platforms via computing platform(s) 902 and/or according to a client/server architecture, a peer-to-peer architecture, and/or other architectures. Users may access system 900 via remote platform(s) 904.

Computing platform(s) 902 may be configured by machine-readable instructions 906. Machine-readable instructions 906 may include one or more instruction modules. The instruction modules may include computer program modules. The instruction modules may include one or more of request receiving module 908, body scan initiation module 910, scan receiving module 912, size recommendation generating module 914, display causing module 916, preview generating module 918, selection receiving module 920, size recommendation storing module 922, clothing trying module 924, and/or other instruction modules.

Request receiving module 908 may be configured to receive a request to perform a self-guided body scan. The self-guided body scan may be performed by a user. The request to perform the self-guided body scan may be received via an application viewable on a mobile device. The request to perform the self-guided body scan may be received in response to the application being opened on the mobile device. The mobile device may include a mobile phone.

Request receiving module 908 may be configured to receive a request to purchase an item of clothing based on the size recommendation. The request to purchase the item of clothing may be received via an application running on a mobile device.

Body scan initiation module 910 may be configured to, in response to receiving the request, initiate a body scanning process including at least a front scan and a side scan. Machine-learning may be utilized in the body scanning process. In some implementations, the front scan may include obtaining an image or series of images of a front side of a user's body. The side scan may include obtaining an image or series of images of a profile of a user's body.

The body scanning process may include a pre-scan sequence of application views. The pre-scan sequence of application views may provide instructions on how to perform a self-guided body scan. The body scanning process may include a post-scan sequence of application views through which a user can modify and/or customize an appearance of a three-dimensional virtual representation of the users body.

Scan receiving module 912 may be configured to receive the front scan and the side scan. Receiving the front scan and the side scan may include obtaining one or more images of a user's body using a mobile device positioned at a distance from the user such that a camera of the mobile device is facing the user. The distance from the user may be between one meter and ten meters.

Size recommendation generating module 914 may be configured to generate a size recommendation based at least in part on the front scan and the side scan. The size recommendation may include a waist size or a leg length size. Generating the size recommendation may include determining one or more dimensions of the user based on the body scan and correlating the one or more dimensions with a size of a garment or wearable accessory. By way of non-limiting example, the waist size or leg length size may be provided in one or more of body dimensions, product dimensions, and/or ad hoc sizes. The body dimensions and/or the product dimensions may be provided in standard units of measure (e.g., inches, centimeters, etc.). By way of non-limiting example, the ad hoc sizes may include one or more of small, medium, large, extra-large, age, infant, toddler, body weight, and/or numerals that are uncorrelated with a unit of measure.

Display causing module 916 may be configured to cause display of the size recommendation through a user interface. The user interface may be disposed at a mobile device.

Preview generating module 918 may be configured to generate a preview including an item of clothing based on the size recommendation. The preview may include the item of clothing being depicted as being worn by a three-dimensional virtual representation of the user.

Selection receiving module 920 may be configured to receive a selection of clothing to virtually try on. The selection of the clothing to virtually try on may be received via an application running on a mobile device.

Size recommendation storing module 922 may be configured to store the size recommendation. Storing the size recommendation may include storing the size recommendation on a mobile device and/or with a profile associated with a user.

Clothing trying module 924 may be configured to virtually try on clothing based on the size recommendation. By way of non-limiting example, the clothing may be available in one or more of various sizes, various styles, various fits, and/or various brands. Virtually trying on the clothing may include viewing a virtual representation of a garment being worn by a three-dimensional virtual representation of a user based on the self-guided body scan. By way of non-limiting example, the various fits may include one or more of slim fit, tapered fit, skinny fit, straight leg fit, bootcut fit, regular fit, relaxed fit, and/or baggy fit.

In some implementations, computing platform(s) 902, remote platform(s) 904, and/or external resources 926 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 902, remote platform(s) 904, and/or external resources 926 may be operatively linked via some other communication media.

A given remote platform 904 may include one or more processors configured to execute computer program modules. The computer program modules may be configured to enable an expert or user associated with the given remote platform 904 to interface with system 900 and/or external resources 926, and/or provide other functionality attributed herein to remote platform(s) 904. By way of non-limiting example, a given remote platform 904 and/or a given computing platform 902 may include one or more of a server, a desktop computer, a laptop computer, a handheld computer, a tablet computing platform, a NetBook, a Smartphone, a gaming console, and/or other computing platforms.

External resources 926 may include sources of information outside of system 900, external entities participating with system 900, and/or other resources. In some implementations, some or all of the functionality attributed herein to external resources 926 may be provided by resources included in system 900.

Computing platform(s) 902 may include electronic storage 928, one or more processors 930, and/or other components. Computing platform(s) 902 may include communication lines, or ports to enable the exchange of information with a network and/or other computing platforms. Illustration of computing platform(s) 902 in FIG. 9 is not intended to be limiting. Computing platform(s) 902 may include a plurality of hardware, software, and/or firmware components operating together to provide the functionality attributed herein to computing platform(s) 902. For example, computing platform(s) 902 may be implemented by a cloud of computing platforms operating together as computing platform(s) 902.

Electronic storage 928 may comprise non-transitory storage media that electronically stores information. The electronic storage media of electronic storage 928 may include one or both of system storage that is provided integrally (i.e., substantially non-removable) with computing platform(s) 902 and/or removable storage that is removably connectable to computing platform(s) 902 via, for example, a port (e.g., a USB port, a firewire port, etc.) or a drive (e.g., a disk drive, etc.). Electronic storage 928 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 928 may include one or more virtual storage resources (e.g., cloud storage, a virtual private network, and/or other virtual storage resources). Electronic storage 928 may store software algorithms, information determined by processor(s) 930, information received from computing platform(s) 902, information received from remote platform(s) 904, and/or other information that enables computing platform(s) 902 to function as described herein.

Processor(s) 930 may be configured to provide information processing capabilities in computing platform(s) 902. As such, processor(s) 930 may include one or more of a digital processor, an analog processor, a digital circuit designed to process information, an analog circuit designed to process information, a state machine, and/or other mechanisms for electronically processing information. Although processor(s) 930 is shown in FIG. 9 as a single entity, this is for illustrative purposes only. In some implementations, processor(s) 930 may include a plurality of processing units. These processing units may be physically located within the same device, or processor(s) 930 may represent processing functionality of a plurality of devices operating in coordination. Processor(s) 930 may be configured to execute modules 908, 910, 912, 914, 916, 918, 920, 922, and/or 924, and/or other modules. Processor(s) 930 may be configured to execute modules 908, 910, 912, 914, 916, 918, 920, 922, and/or 924, and/or other modules by software; hardware; firmware; some combination of software, hardware, and/or firmware; and/or other mechanisms for configuring processing capabilities on processor(s) 930. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, 920, 922, and/or 924 are illustrated in FIG. 9 as being implemented within a single processing unit, in implementations in which processor(s) 930 includes multiple processing units, one or more of modules 908, 910, 912, 914, 916, 918, 920, 922, and/or 924 may be implemented remotely from the other modules. The description of the functionality provided by the different modules 908, 910, 912, 914, 916, 918, 920, 922, and/or 924 described below is for illustrative purposes, and is not intended to be limiting, as any of modules 908, 910, 912, 914, 916, 918, 920, 922, and/or 924 may provide more or less functionality than is described. For example, one or more of modules 908, 910, 912, 914, 916, 918, 920, 922, and/or 924 may be eliminated, and some or all of its functionality may be provided by other ones of modules 908, 910, 912, 914, 916, 918, 920, 922, and/or 924. As another example, processor(s) 930 may be configured to execute one or more additional modules that may perform some or all of the functionality attributed below to one of modules 908, 910, 912, 914, 916, 918, 920, 922, and/or 924.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of a particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user or may be the particular user's account or information stored on the social-networking system or other computing system. As an example and not by way of limitation, a first user may view one or more second users of an online social network through a "People You May Know" function of the online social network or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user while keeping the videos from being visible to the first user's employer. In particular embodiments, different privacy settings may be provided for different user groups or user demographics. As an example and not by way of limitation, a first user may specify that other users who attend the same university as the first user may view the first user's pictures but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app) and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 10:
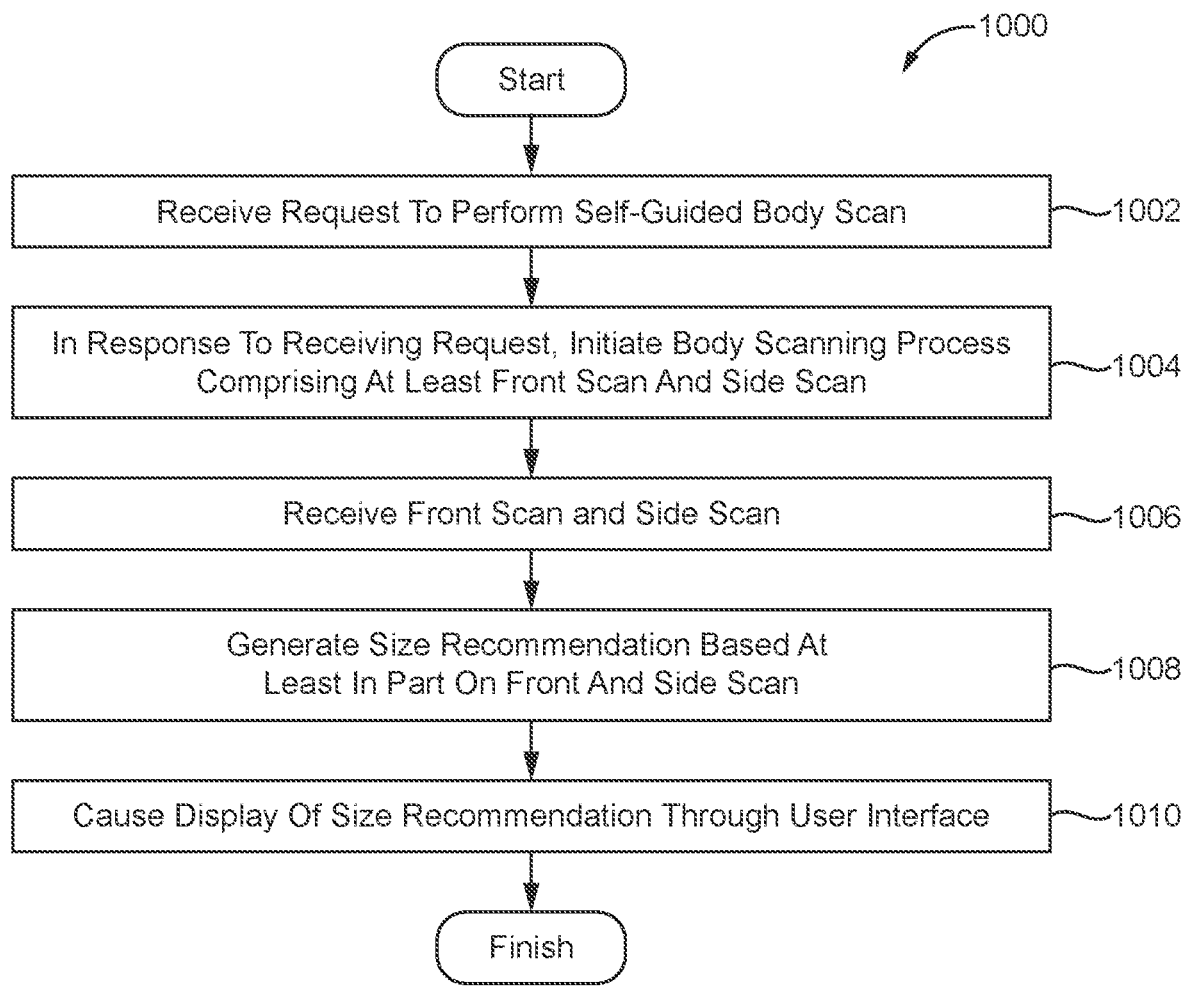
FIG. 10 illustrates an example flow diagram for human body scanning, according to certain aspects of the disclosure.

FIG. 10 illustrates an example flow diagram (e.g., process 1000) for human body scanning, according to certain aspects of the disclosure. For explanatory purposes, the example process 1000 is described herein with reference to FIGS. 1-9. Further for explanatory purposes, the steps of the example process 1000 are described herein as occurring in serial, or linearly. However, multiple instances of the example process 1000 may occur in parallel. For purposes of explanation of the subject technology, the process 1000 will be discussed in reference to FIGS. 1-9.

At step 1002, the process 1000 may include receiving a request to perform a self-guided body scan. At step 1004, the process 1000 may include, in response to receiving the request, initiating a body scanning process including at least a front scan and a side scan. At step 1006, the process 1000 may include receiving the front scan and the side scan. At step 1008, the process 1000 may include generating a size recommendation based at least in part on the front scan and the side scan. At step 1010, the process 1000 may include causing display of the size recommendation through a user interface.

For example, as described above in relation to FIG. 9, at step 1002, the process 1000 may include receiving a request to perform a self-guided body scan, through request receiving module 908. At step 1004, the process 1000 may include, in response to receiving the request, initiating a body scanning process including at least a front scan and a side scan, through body initiation module 910. At step 1006, the process 1000 may include receiving the front scan and the side scan, through scan receiving module 912. At step 1008, the process 1000 may include generating a size recommendation based at least in part on the front scan and the side scan, through size recommendation generating module 914. At step 1010, the process 1000 may include causing display of the size recommendation through a user interface, through display causing module 916.

According to an aspect, the process 1000 may include generating a preview comprising an item of clothing based on the size recommendation.

According to an aspect, the process 1000 may include receiving a selection of clothing to virtually try on.

According to an aspect, the process 1000 may include storing the size recommendation.

According to an aspect, the self-guided body scan is performed by a user.

According to an aspect, the size recommendation comprises a waist size or a leg length size.

According to an aspect, the process 1000 may include receiving a request to purchase an item of clothing based on the size recommendation.

According to an aspect, machine-learning is utilized in the body scanning process.

According to an aspect, the process 1000 may include virtually trying on clothing based on the size recommendation.

According to an aspect, the clothing is available in one or more of various sizes, various styles, various fits, and/or various brands.

Figure 11:
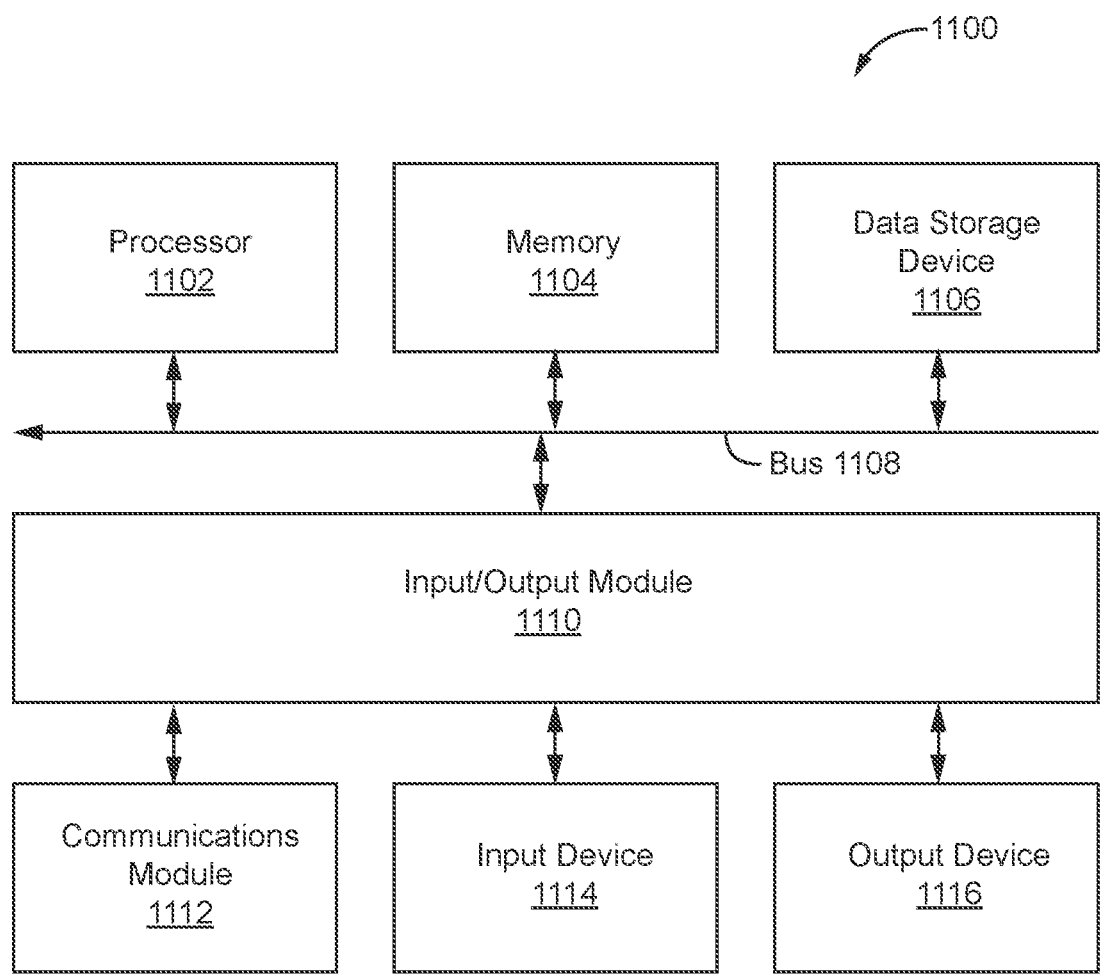
FIG. 11 is a block diagram illustrating an example computer system (e.g., representing both client and server) with which aspects of the subject technology can be implemented.

FIG. 11 is a block diagram illustrating an exemplary computer system 1100 with which aspects of the subject technology can be implemented. In certain aspects, the computer system 1100 may be implemented using hardware or a combination of software and hardware, either in a dedicated server, integrated into another entity, or distributed across multiple entities.

Computer system 1100 (e.g., server and/or client) includes a bus 1108 or other communication mechanism for communicating information, and a processor 1102 coupled with bus 1108 for processing information. By way of example, the computer system 1100 may be implemented with one or more processors 1102. Processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 can include, in addition to hardware, code that creates an execution environment for the computer program in question, e.g., code that constitutes processor firmware, a protocol stack, a database management system, an operating system, or a combination of one or more of them stored in an included memory 1104, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. The processor 1102 and the memory 1104 can be supplemented by, or incorporated in, special purpose logic circuitry.

The instructions may be stored in the memory 1104 and implemented in one or more computer program products, i.e., one or more modules of computer program instructions encoded on a computer-readable medium for execution by, or to control the operation of, the computer system 1100, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106, such as a magnetic disk or optical disk, coupled to bus 1108 for storing information and instructions. Computer system 1100 may be coupled via input/output module 1110 to various devices. The input/output module 1110 can be any input/output module. Exemplary input/output modules 1110 include data ports, such as USB ports. The input/output module 1110 is configured to connect to a communications module 1112. Exemplary communications modules 1112 include networking interface cards, such as Ethernet cards and modems. In certain aspects, the input/output module 1110 is configured to connect to a plurality of devices, such as an input device 1114 and/or an output device 1116. Exemplary input devices 1114 include a keyboard and a pointing device, e.g., a mouse or a trackball, by which a user can provide input to the computer system 1100. Other kinds of input devices 1114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1116 include display devices, such as an LCD (liquid crystal display) monitor, for displaying information to the user.

According to one aspect of the present disclosure, the above-described gaming systems can be implemented using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in the main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1100 can include clients and servers. A client and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1102 for execution. Such a medium may take many forms, including, but not limited to, non-volatile media, volatile media, and transmission media. Non-volatile media include, for example, optical or magnetic disks, such as data storage device 1106. Volatile media include dynamic memory, such as memory 1104. Transmission media include coaxial cables, copper wire, and fiber optics, including the wires that comprise bus 1108. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, RAM, PROM, EPROM, FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1100 reads game data and provides a game, information may be read from the game data and stored in a memory device, such as the memory 1104. Additionally, data from the memory 1104 servers accessed via a network the bus 1108 or the data storage 1106 may be read and loaded into the memory 1104. Although data is described as being found in the memory 1104, it will be understood that data does not have to be stored in the memory 1104 and may be stored in other memory accessible to the processor 1102 or distributed among several media, such as the data storage 1106.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order or that all illustrated operations be performed to achieve desirable results. The actions recited in the claims can be performed in a different order and still achieve desirable results. As one example, the processes depicted in the accompanying figures do not necessarily require the particular order shown or sequential order to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for human body scanning for size recommendation, comprising:
   receiving a request to perform a self-guided body scan for a user;
   in response to receiving the request:
      generating a user interface for a body scanning process, the user interface comprising a scan sequence indicator including milestone user interface elements, the milestone user interface elements indicating corresponding actions to be taken by the user, the actions including at least a front scan and a side scan;
      initiating the body scanning process comprising at least the front scan and the side scan as prompted by the scan sequence indicator; and
      updating the user interface, as the actions are taken by the user, including passing the corresponding milestone user interface elements across a midpoint of the scan sequence indicator, the midpoint corresponding to a current action of the body scanning process;
   upon completion of the body scanning process, receiving the front scan and the side scan;
   generating a size recommendation based at least in part on the front scan and the side scan; and
   causing display of the size recommendation through the user interface.

2. The method of claim 1, further comprising:
   generating a preview comprising an item of clothing based on the size recommendation.

3. The method of claim 1, further comprising:
   receiving a selection of clothing to virtually try on.

4. The method of claim 1, further comprising:
   storing the size recommendation.

5. The method of claim 1, wherein the self-guided body scan is performed by the user.

6. The method of claim 1, wherein the size recommendation comprises a waist size or a leg length size.

7. The method of claim 1, further comprising:
   receiving a request to purchase an item of clothing based on the size recommendation.

8. The method of claim 1, wherein machine-learning is utilized in the body scanning process.

9. The method of claim 1, further comprising:
virtually trying on clothing based on the size recommendation.

10. The method of claim 9, wherein the clothing is available in one or more of various sizes, various styles, various fits, and/or various brands.

11. A system configured for human body scanning for size recommendation, the system comprising:
one or more hardware processors configured by machine-readable instructions to:
receive a selection of clothing to virtually try on;
receive a request to perform a self-guided body scan for a user;
in response to receiving the request:
generate a user interface for a body scanning process, the user interface comprising a scan sequence indicator including milestone user interface elements, the milestone user interface elements indicator corresponding actions to be taken by the user, the actions including at least a front scan and a side scan;
initiate the body scanning process comprising at least the front scan and the side scan as prompted by the scan sequence indicator; and
update the user interface, as the actions are taken by the user, including passing the corresponding milestone user interface elements across a midpoint of the scan sequence indicator, the midpoint corresponding to a current action of the body scanning process;
upon completion of the body scanning process, receive the front scan and the side scan;
generate a size recommendation based at least in part on the front scan and the side scan;
cause display of the size recommendation through the user interface; and
store the size recommendation.

12. The system of claim 11, wherein the one or more hardware processors are further configured by machine-readable instructions to:
generate a preview comprising an item of clothing based on the size recommendation.

13. The system of claim 11, wherein the body scanning process includes a pre-scan sequence of application views.

14. The system of claim 13, wherein the pre-scan sequence of application views provides instructions on how to perform a self-guided body scan.

15. The system of claim 11, wherein the self-guided body scan is performed by the user.

16. The system of claim 11, wherein the size recommendation comprises a waist size or a leg length size.

17. The system of claim 11, wherein the one or more hardware processors are further configured by machine-readable instructions to:
receive a request to purchase an item of clothing based on the size recommendation.

18. The system of claim 11, wherein machine-learning is utilized in the body scanning process, and wherein the clothing is available in one or more of various sizes, various styles, various fits, and/or various brands.

19. The system of claim 11, wherein the one or more hardware processors are further configured by machine-readable instructions to:
virtually try on clothing based on the size recommendation.

20. A non transitory computer-readable storage medium having instructions embodied thereon, the instructions being executable by one or more processors to perform a method for human body scanning for size recommendation, the method comprising:
receiving a selection of clothing to virtually try on;
receiving a request to perform a self-guided body scan for a user;
in response to receiving the request:
generating a user interface for a body scanning process, the user interface comprising a scan sequence indicator including milestone user interface elements, the milestone user interface elements indicating corresponding actions to be taken by the user, the actions including at least a front scan and a side scan;
initiating the body scanning process comprising at least the front scan and the side scan as prompted by the scan sequence indicator; and
updating the user interface, as the actions are taken by the user, including passing the corresponding milestone user interface elements across a midpoint of the scan sequence indicator, the midpoint corresponding to a current action of the body scanning process;
upon completion of the body scanning process, receiving the front scan and the side scan;
generating a size recommendation based at least in part on the front scan and the side scan;
causing display of the size recommendation through the user interface;
generating a preview comprising the selected clothing based on the size recommendation; and
receiving a request to purchase an item of clothing based on the size recommendation.

* * * * *